United States Patent
Son et al.

(10) Patent No.: US 9,985,291 B2
(45) Date of Patent: May 29, 2018

(54) CATHODE ACTIVE MATERIAL FOR LITHIUM-SULFUR BATTERY AND MANUFACTURING METHOD THEREFOR

(71) Applicant: LG CHEM, LTD., Seoul (KR)

(72) Inventors: Byoungkuk Son, Daejeon (KR); Minchul Jang, Daejeon (KR); Yu Mi Kim, Daejeon (KR); Hong Kyu Park, Daejeon (KR); Da Young Sung, Daejeon (KR); Seong Ho Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 335 days.

(21) Appl. No.: 14/655,944

(22) PCT Filed: Jan. 7, 2014

(86) PCT No.: PCT/KR2014/000134
§ 371 (c)(1),
(2) Date: Jun. 26, 2015

(87) PCT Pub. No.: WO2014/109523
PCT Pub. Date: Jul. 17, 2014

(65) Prior Publication Data
US 2015/0340696 A1  Nov. 26, 2015

(30) Foreign Application Priority Data

Jan. 8, 2013  (KR) .................... 10-2013-0001871

(51) Int. Cl.
*H01M 4/60* (2006.01)
*H01M 4/38* (2006.01)
(Continued)

(52) U.S. Cl.
CPC ............. *H01M 4/604* (2013.01); *H01M 4/13* (2013.01); *H01M 4/139* (2013.01); *H01M 4/364* (2013.01);
(Continued)

(58) Field of Classification Search
None
See application file for complete search history.

(56) References Cited

U.S. PATENT DOCUMENTS 7,029,796 B2 * 4/2006 Choi .................. H01M 4/136
252/182.1
2003/0049529 A1 * 3/2003 Cho .................. H01M 4/386
429/217
(Continued)

FOREIGN PATENT DOCUMENTS

CN          1495937 A      5/2004
JP       2003-123739 A     4/2003
(Continued)

OTHER PUBLICATIONS

Fu, Y. et al, "Sulfur-Carbon Nanocomposite Cathodes Improved by an Amphiphilic Block Copolymer for High-Rate Lithium-Sulfur Batteries," ACS Appl. Mater. Interfaces, 2012, vol. 4, pp. 6046-6052.
(Continued)

*Primary Examiner* — Oi K Conley
(74) *Attorney, Agent, or Firm* — Birch, Stewart, Kolasch & Birch, LLP

(57) ABSTRACT

The present invention relates to a cathode active material for a lithium-sulfur battery and a method of preparing the same, and more particularly, to a cathode active material for a lithium-sulfur battery comprising: an amphiphilic polymer comprising hydrophilicity parts and hydrophobicity parts; and a sulfur-carbon composite, and a method of preparing
(Continued)

the same. When a lithium-sulfur battery is prepared using the cathode active material, there is an effect which may enhance the electric conductivity in an electrode, cycle characteristics and capacity.

10 Claims, 1 Drawing Sheet

(51) Int. Cl.
*H01M 4/58* (2010.01)
*H01M 4/13* (2010.01)
*H01M 4/139* (2010.01)
*H01M 4/36* (2006.01)
*H01M 4/62* (2006.01)
*H01M 4/583* (2010.01)
H01M 10/052 (2010.01)
H01M 10/0568 (2010.01)
H01M 10/0569 (2010.01)
H01M 4/02 (2006.01)

(52) U.S. Cl.
CPC ............ *H01M 4/366* (2013.01); *H01M 4/38* (2013.01); *H01M 4/382* (2013.01); *H01M 4/58* (2013.01); *H01M 4/583* (2013.01); *H01M 4/622* (2013.01); *H01M 4/625* (2013.01); *H01M 10/052* (2013.01); *H01M 10/0568* (2013.01); *H01M 10/0569* (2013.01); *H01M 2004/028* (2013.01)

(56) References Cited

U.S. PATENT DOCUMENTS

| | | |
|---|---|---|
| 2003/0073000 A1 | 4/2003 | Lee et al. |
| 2004/0009399 A1 | 1/2004 | Kim et al. |
| 2004/0029014 A1 | 2/2004 | Hwang et al. |
| 2009/0311604 A1 | 12/2009 | Nazar et al. |
| 2011/0052998 A1 | 3/2011 | Liang et al. |
| 2011/0059361 A1 | 3/2011 | Wilkening et al. |
| 2012/0088154 A1 | 4/2012 | Liu et al. |
| 2012/0119161 A1 | 5/2012 | Son et al. |
| 2013/0065128 A1* | 3/2013 | Li .................... H01M 4/136 429/218.1 |

FOREIGN PATENT DOCUMENTS

| | | |
|---|---|---|
| KR | 10-2003-0027395 A | 4/2003 |
| KR | 10-2004-0005439 A | 1/2004 |
| KR | 10-2004-0013585 A | 2/2004 |
| KR | 10-2005-0038897 A | 4/2005 |
| KR | 10-2012-0051549 A | 5/2012 |

OTHER PUBLICATIONS

International Search Report dated Apr. 30, 2014 for Appl. No. PCT/KR2014/000134 (w/ English translation).

Korean Office Action dated Mar. 30, 2015 for Appl. No. 10-2014-0001832 (w/ English translation).

Written Opinion of the International Searching Authority dated Apr. 30, 2014 for Appl. No. PCT/KR2014/000134 (w/ English translation).

Extended European Search Report for Appl. No. 14738141.2 dated May 2, 2016.

Ji, X. et al, "A highly ordered nanostructured carbon-sulphur cathode for lithium-sulphur batteries," Nature Materials, Jun. 1, 2009, vol. 8, No. 6, pp. 500-506.

Korean Office Action dated Oct. 29, 2015 for Appl. No. 10-2014-0001832 (w/ English translation).

* cited by examiner

[Figure 1]
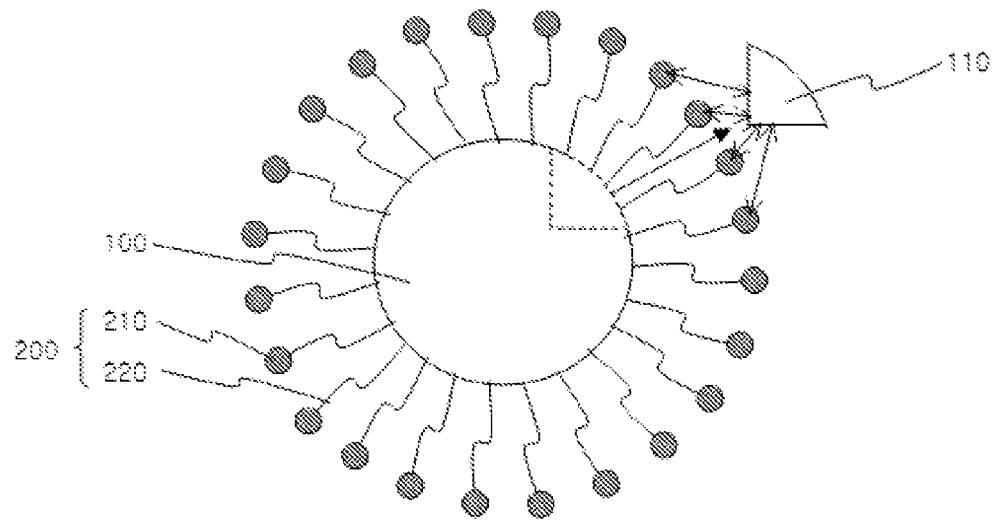
[Figure 2]
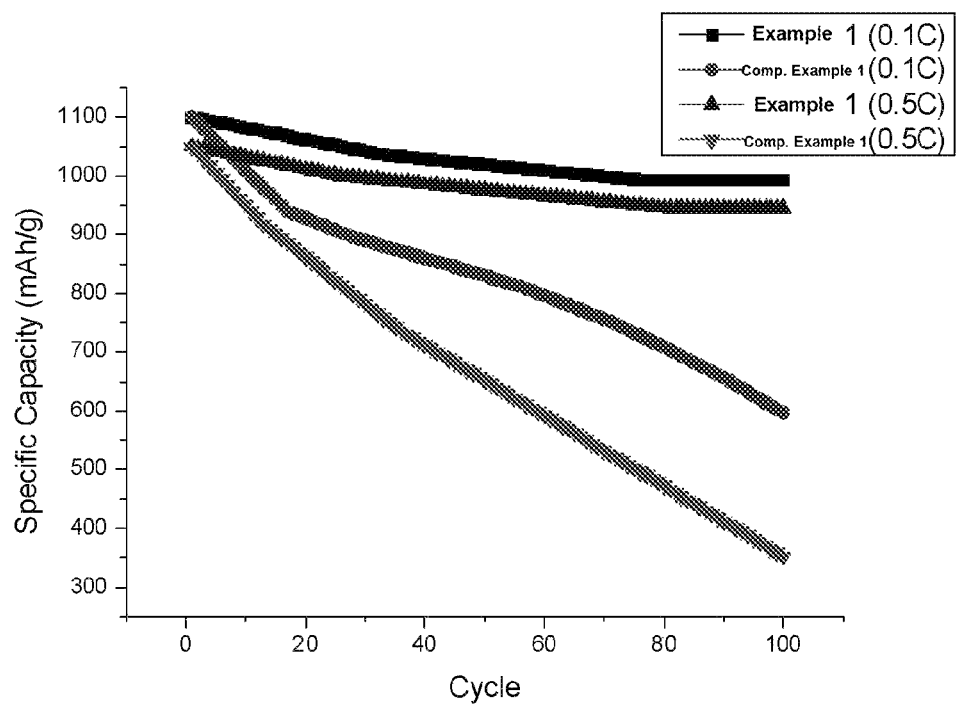

CATHODE ACTIVE MATERIAL FOR LITHIUM-SULFUR BATTERY AND MANUFACTURING METHOD THEREFOR

TECHNICAL FIELD

The present application relates to a cathode active material for a lithium-sulfur battery and a method of preparing the same.

The present application claims priority from Korean Patent Application No. 10-2013-0001871 filed on Jan. 8, 2013 in the KIPO, the disclosure of which is incorporated herein by reference in its entirety.

BACKGROUND ART

There has been considerable interest in recent years in developing high energy density batteries using lithium as a negative electrode. Lithium metal is particularly attractive as an anode active material of an electrochemical battery because of light weight and high energy density of the metal, for example, compared to a lithium-intercalated carbon negative electrode, which increases the weight and volume of the negative electrode to reduce the energy density of a battery due to the presence of non-electroactive materials, and other electrochemical systems having nickel or cadmium electrodes. A negative electrode principally including a lithium metal negative electrode or a lithium metal provides an opportunity to produce a battery which is lighter in weight and has a higher energy density than batteries such as lithium-ion, nickel metal hydride or nickel-cadmium batteries. These characteristics are highly desirable for batteries for portable electronic devices, such as mobile phones and lap-top computers, which are paid with low weighted value in terms of premium.

These types of cathode active materials for a lithium battery are publicly known, and include a sulfur-containing cathode active material including sulfur-sulfur bonds, in which high energy capacity and rechargeability are achieved from the electrochemical cleavage (reduction) and reformation (oxidation) of the sulfur-sulfur bonds.

Lithium-sulfur batteries in which an alkali metal such as lithium is used as an anode active material and sulfur is used as a cathode active material as described above have a theoretical energy density of 2,800 Wh/kg (1,675 mAh), which is much higher than those of other battery systems, and have recently been in the spotlight used for portable electronic devices due to an advantage in that sulfur is abundant as a natural resource, inexpensive, and environmentally-friendly.

However, since sulfur used as a cathode active material of a lithium-sulfur battery is a non-current collector, there are problems in that it is difficult for electrons produced by an electrochemical reaction to move, sulfur leaks into the electrolyte during the oxidation-reduction reaction so that the service life of a battery deteriorates, and furthermore, when an appropriate electrolytic solution is not selected, lithium polysulfide which is a reduced material of sulfur is eluted so that lithium polysulfide may no longer participate in the electrochemical reaction.

Thus, in order to minimize the amount of lithium polysulfide which is dissolved into the electrolytic solution and impart electric conductivity characteristics to a sulfur electrode which is a non-current collector, a technology in which a composite of carbon and sulfur is used as a positive electrode has been developed, but an elution problem of lithium polysulfide still cannot be solved.

Therefore, there is a high need for a technology to enhance cycle characteristics by effectively blocking lithium polysulfide from leaking into the electrolyte during the discharge of a lithium-sulfur battery.

DETAILED DESCRIPTION OF THE INVENTION

Technical Problem

The present application has been made in an effort to solve the problems in the related art as described above and technical problems requested to be solved from the past. That is, an object of the present application is to provide a technology of enhancing cycle characteristics by effectively blocking lithium polysulfide from leaking into the electrolyte during the discharge of a lithium-sulfur battery.

Technical Solution

The present application provides a cathode active material for a lithium-sulfur battery including: an amphiphilic polymer including hydrophilicity parts and hydrophobicity parts; and a sulfur-carbon composite.

Further, the present application provides a positive electrode including the cathode active material for a lithium-sulfur battery.

In addition, the present application provides a lithium-sulfur battery including:

a negative electrode including lithium metal or a lithium alloy as an anode active material;

a positive electrode including the cathode active material as a cathode active material;

a separator positioned between the positive electrode and the negative electrode; and an electrolyte impregnated in the negative electrode, the positive electrode and the separator and including a lithium salt and an organic solvent.

Further, the present application provides a battery module including the lithium-sulfur battery as a unit cell.

In addition, the present application provides a method of preparing a cathode active material for a lithium-sulfur battery, the method including: mixing a solution including a sulfur-carbon composite and an amphiphilic polymer including hydrophilicity parts and hydrophobicity parts.

Advantageous Effects

According to the present application, a cathode active material may be prepared by adding an amphiphilic polymer including hydrophilicity parts and hydrophobicity parts to a sulfur-carbon composite and the amphiphilic polymer may bind sulfur to carbon more firmly, thereby enhancing electric conductivity in an electrode. Furthermore, as hydrophilicity parts of the amphilphilic polymer capture lithium polysulfide produced during the discharge to solve an elution problem of lithium polysulfide, there is an effect that may enhance cycle characteristics and capacity of the lithium-sulfur battery.

BRIEF DESCRIPTION OF DRAWINGS

FIG. 1 is a schematic view of a micelle structure of a sulfur-carbon composite and an amphiphilic polymer as an exemplary embodiment of the present application.

FIG. 2 is a graph comparing discharge capacities for each C-rate and each Cycle obtained in Experimental Example 1 for the batteries of Example 1 and Comparative Example 1 as an exemplary embodiment of the present application.

DESCRIPTION OF MAIN PARTS OF DRAWINGS

100: Sulfur-carbon composite
110: Lithium polysulfide
200: Amphiphilic polymer
210: Hydrophilicity part
220: Hydrophobicity part Best Mode Hereinafter, the present application will be described in more detail.

As a result of intensive studies and repeated experiments, the present inventors of the present application have confirmed that in the case of using a cathode active material further containing an amphiphilic polymer including hydrophilicity parts and hydrophobicity parts in a sulfur-carbon composite, cycle characteristics of a lithium-sulfur battery may be enhanced by suppressing a phenomenon in which lithium polysulfide is dissolved into the electrolytic solution because the amphiphilic polymer having both hydrophilicity and hydrophobicity binds sulfur to carbon and captures lithium polysulfide produced during the discharge, thereby completing the present invention.

The cathode active material for a lithium-sulfur battery according to an exemplary embodiment of the present application is characterized to include an amphiphilic polymer including hydrophilicity parts and hydrophobicity parts; and a sulfur-carbon composite.

The amphiphilic polymer is a material having both hydrophilicity parts and hydrophobicity parts. Examples of the amphiphilic polymer include polyvinyl pyrrolidone (PVP), polyethylene oxide (PEO), polyvinyl alcohol (PVA), a copolymer thereof, and the like, but the amphiphilic polymer is not limited thereto.

In one specific example, the amphiphilic polymer may be positioned on at least a part of the surface of a sulfur-carbon composite. Further, the amphiphilic polymer may be positioned over an entire region of the surface of the sulfur-carbon composite.

In addition, the amphiphilic polymer may be positioned on the surface of the sulfur-carbon composite to form a micelle structure, and specifically, the hydrophobicity parts of the amphiphilic polymer are oriented toward the sulfur-carbon composite, and the hydrophilicity parts may be oriented outwardly.

As an exemplary embodiment of the present application, a schematic view of a micelle structure of a sulfur-carbon composite and an amphiphilic polymer is illustrated in the following FIG. 1.

Referring to FIG. 1, a cathode active material includes a sulfur-carbon composite 100 and an amphiphilic polymer 200.

The amphiphilic polymer 200 is composed of a hydrophilicity part 210 and a hydrophobicity part 220, the hydrophobicity part 220 is oriented toward the sulfur-carbon composite 100, and the hydrophilicity part 210 is oriented outwardly, thereby forming a micelle structure.

Since the sulfur-carbon composite 100 is not a structure in which the composite is completely blocked by the amphiphilic polymer 200 as seen in FIG. 1, the inventors of the present application have confirmed that it is easy for lithium ions to move toward the electrode of the sulfur-carbon composite 100 during the charge, elution of sulfur is reduced by attraction (↔) of lithium polysulfide ($Li_2S_x$(x=4 to 8): 110) of a hydrophilic material eluted from the hydrophilicity part 210 of the amphiphilic polymer 200 and the sulfur-carbon composite 100 during the discharge, and as a result, cycle characteristics and capacity of a lithium-sulfur battery including the cathode active material have been improved.

In one specific example, the amphiphilic polymer may be included in an amount of more than 0 and less than 35 wt % based on the total weight of the cathode active material.

When the amphiphilic polymer is not included, a binding force of sulfur and carbon may not be obtained at a desired level, and an elution problem of lithium polysulfide may not be sufficiently solved, and when the amphiphilic polymer is include in an amount of 35 wt % or more, the amount of the sulfur-carbon composite is relatively decreased and a desired capacity may not be obtained, which is not preferred.

The amphiphilic polymer may be included specifically in an amount of 0.1 to 33 wt %, and more specifically in an amount of 1.0 to 33 wt %, based on the total weight of the cathode active material.

As one specific example, the sulfur-carbon composite may be formed by applying sulfur particles on porous carbon and may also be formed by dissolving sulfur particles and mixing the sulfur particles with carbon, and in this case, the content ratio of carbon and sulfur of the sulfur-carbon composite may be 1:20 to 1:1 based on the weight.

The carbon may be crystalline or amorphous carbon and is not limited as long as the carbon is a conductive carbon, and may be, for example, graphite, carbon black, activated carbon fiber, non-activated carbon nanofiber, carbon nanotube, carbon fabric and the like.

The present invention also provides a method of preparing a cathode active material for a lithium-sulfur battery, the method including: mixing a solution including a sulfur-carbon composite and an amphiphilic polymer including hydrophilicity parts and hydrophobicity parts.

The method of preparing a cathode active material for a lithium-sulfur battery is not limited, and the cathode active material for a lithium-sulfur battery may be prepared by mixing an amphiphilic polymer including hydrophilicity parts and hydrophobicity parts with a sulfur-carbon composite.

The amphiphilic polymer may be included in an amount of more than 0 and less than 35 wt % based on the total weight of the cathode active material.

The present invention also provides a positive electrode for a lithium-sulfur battery including the cathode active material for a lithium-sulfur battery.

The positive electrode may further include one or more additives selected from transition metal elements, IIIA Group elements, IVA Group elements, sulfur compounds of these elements, and alloys of these elements and sulfur in addition to the cathode active material.

The transition metal elements include Sc, Ti, V, Cr, Mn, Fe, Co, Ni, Cu, Zn, Y, Zr, Nb, Mo, Tc, Ru, Rh, Pd, Os, Ir, Pt, Au, Hg and the like, the IIIA Group elements include Al, Ga, In, Ti and the like, and the IVA Group elements include Ge, Sn, Pb and the like.

The positive electrode may further include a cathode active material, or optionally along with an additive, an electrically conducting conductive material for facilitating the movement of electrons in the positive electrode, and a binder for attaching the cathode active material to a current collector well.

The conductive material is not particularly limited, but a graphite-based material such as KS6, a conducting material such as a carbon-based material such as Super-P, denka black and carbon black or a conducting polymer such as polyaniline, polythiophene, polyacetylene, and polypyrrole may be used either alone or in mixture.

As the binder, it is possible to use poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, a copolymer of polyhexafluoropropylene and polyvinylidene fluoride (trade name: Kynar), poly(ethyl acrylate), polytetrafluoroethylene polyvinyl chloride, polyacrilonitrile, polyvinyl pyridine, polystyrene, derivatives, blends and copolymers thereof and the like.

The content of the binder may be 0.5 to 30 wt % based on the total weight of a mixture including the cathode active material. When the content of the binder is less than 0.5 wt %, there is a problem in that physical properties of the positive electrode deteriorate and the active material and the conductive material in the positive electrode are detached, and when the content exceeds 30 wt %, the ratio of the active material and the conductive material is relatively reduced at the positive electrode and the battery capacity may be reduced, which is not preferred.

When the method of preparing a positive electrode is specifically observed as an exemplary embodiment of the present application, first, the binder is dissolved in a solvent for preparing slurry, and then a conductive material is dispersed. It is preferred that as the solvent for preparing slurry, a solvent which may uniformly disperse a cathode active material, a binder and a conductive material and is easily evaporated is used, and as a representative solvent, acetonitrile, methanol, ethanol, tetrahydrofuran, water, isopropyl alcohol and the like may be used. Next, a positive electrode slurry is prepared by again uniformly dispersing a cathode active material, or optionally along with an additive, in a solvent in which the conductive material is dispersed. The amount of the solvent, the cathode active material, or optionally the additive to be included in the slurry does not have any particularly important meaning in the present application, and is sufficient as long as an appropriate viscosity is possessed so as to facilitate only the coating of the slurry.

A positive electrode is formed by applying the slurry thus-prepared to the current collector, followed by vacuum drying. The slurry is sufficient as long as the slurry is coated in an appropriate thickness on the current collector according to the viscosity of the slurry and the thickness of the positive electrode to be formed, and the current collector is not particularly limited, but it is preferred that a conducting material such as stainless steel, aluminum, copper and titanium is used, and more preferred that a carbon-coated aluminum current collector is used. The use of an Al substrate on which carbon is coated is advantageous in that adhesion strength to the cathode active material is excellent, contact resistance is low, and corrosion of aluminum by polysulfide may be prevented compared to an Al substrate on which no carbon is coated.

The present application also provides a lithium-sulfur battery including the cathode active material.

The lithium-sulfur battery is specifically characterized to include a negative electrode including lithium metal or a lithium alloy as an anode active material; a positive electrode including a sulfur-carbon composite on which polyvinyl pyrrolidone as a cathode active material is coated; a separator positioned between the positive electrode and the negative electrode; and an electrolyte impregnated in the negative electrode, the positive electrode and the separator and including a lithium salt and an organic solvent.

As the anode active material, the lithium alloy is an alloy of lithium and metal selected from the group consisting of Na, K, Rb, Cs, Fr, Be, Mg, Ca, Sr, Ba, Ra, Al and Sn, but is not limited thereto.

The separator positioned between the positive electrode and the negative electrode is capable of separating or isolating the positive electrode and the negative electrode, and transporting lithium ions between the positive electrode and the negative electrode, and may be composed of a porous non-conducting or isolating material. The separator may be an independent member such as a film, and may be a coating layer added to the positive electrode and/or the negative electrode.

Examples of a material constituting the separator include polyolefin such as polyethylene and polypropylene, a glass fiber filter paper and a ceramic material, but the material is not limited thereto, and the thickness may be about 5 μm to about 50 μm, specifically, about 5 μm to about 25 μm.

The electrolyte impregnated in the negative electrode, the positive electrode and the separator includes a lithium salt and an organic solvent.

The concentration of the lithium salt may be about 0.2 M to about 2.0 M according to various factors such as the exact composition of the electrolyte solvent mixture, the solubility of the salt, the conductivity of the dissolved salt, charge and discharge conditions of the battery, working temperature and other factors publicly known in the lithium battery field. Examples of the lithium salt for use in the present application include one or more from the group consisting of LiSCN, LiBr, LiI, $LiPF_6$, $LiBF_4$, $LiSO_3CF_3$, $LiClO_4$, $LiSO_3CH_3$, $LiB(Ph)_4$, $LiC(SO_2CF_3)_3$ and $LiN(SO_2CF_3)_2$.

As the organic solvent, a single solvent may be used, and a mixed organic solvent of two or more solvents may be used. When a mixed organic solvent of two or more solvents is used, it is preferred that one or more solvents are selected from two or more groups of a weak polar solvent group, a strong polar solvent group and a lithium metal protection solvent group, and used.

The weak polar solvent is defined as a solvent having a dielectric constant less than 15, which may dissolve the sulfur element in the aryl compound, bicyclic ether and a non-cyclic carbonate, the strong polar solvent is defined as a solvent having a dielectric constant more than 15, which may dissolve lithium polysulfide in bicyclic carbonate, a sulfoxide compound, a lactone compound, a ketone compound, an ester compound, a sulfate compound, and a sulfite compound, and the lithium metal protection solvent is defined as a solvent which forms a stable solid electrolyte interface (SEI) on a lithium metal such as heterocyclic compounds including saturated ether compounds, unsaturated ether compounds, or N, O, S, or a combination thereof, and which has a charge-discharge cycle efficiency of at least 50.

Specific examples of the weak polar solvent include xylene, dimethoxyethane, 2-methyltetrahydrofuran, diethyl carbonate, dimethyl carbonate, toluene, dimethyl ether, diethyl ether, diglyme, tetraglyme and the like.

Specific Examples of the strong polar solvent include hexamethyl phosphoric triamide, γ-butyrolactone, acetonitrile, ethylene carbonate, propylene carbonate, N-methylpyrrolidone, 3-methyl-2-oxazolidone, dimethyl formamide, sulfolane, dimethyl acetamide, dimethyl sulfoxide, dimethyl sulfate, ethylene glycol diacetate, dimethyl sulfite, or ethylene glycol sulfite and the like.

Specific examples of the lithium protection solvent include tetrahydrofuran, ethylene oxide, dioxolane, 3,5-dimethylisoxazole, furan, 2-methyl furan, 1,4-oxane, 4-methyldioxolane and the like.

The present application provides a battery module including the lithium-sulfur battery as a unit cell.

The battery module may be specifically used as a power source for an electric vehicle, a hybrid electric vehicle, a plug-in hybrid electric vehicle or a power storage apparatus.

Best Mode

Hereinafter, the present invention will be described with reference to the Examples of the present application, but the following Examples are provided for illustrating the present invention, and the scope of the present invention is not limited to the Examples only.

EXAMPLES

Example 1

A composite of carbon and sulfur was prepared by mixing conductive carbon having electric conductivity and sulfur in a ratio of 30:70 wt % and subjecting the mixture to a ball-mill process. Thereafter, the mixture was put into an aqueous solution obtained by dissolving polyvinyl pyrrolidone (PVP) in an amount of 10 wt % in DI water, and a mixture was mixed, thereby obtaining a composite of carbon, sulfur and PVP. In this case, PVP in the cathode active material was included in an amount of 5 wt %.

A positive electrode slurry was prepared by adding a positive electrode mixture with a composition of 70.0 wt % of the cathode active material including the composite, 20.0 wt % of Super-P (conductive material) and 10.0 wt % of PVDF (binder) to N-methyl-2-pyrrolidone (NMP) as a solvent, and then coated on an aluminum current collector, thereby preparing a positive electrode.

A lithium foil having a thickness of about 150 μm as a negative electrode and a mixed electrolytic solution of dimethoxyethane in which 1 M LiN(CF$_3$SO$_2$)$_2$ was dissolved and dioxolane (5:4 volume ratio) as an electrolytic solution were used and 16 micron polyolefin was used as a separator, thereby manufacturing a lithium-sulfur battery.

Example 2

An experiment was performed in the same manner as in Example 1, except that PVP in the cathode active material was prepared in an amount of 10 wt % using a PVP aqueous solution in which PVP was dissolved in an amount of 20 wt % in DI water.

Example 3

An experiment was performed in the same manner as in Example 1, except that PVP in the cathode active material was prepared in an amount of 15 wt % using a PVP aqueous solution in which PVP was dissolved in an amount of 30 wt % in DI water.

Example 4

An experiment was performed in the same manner as in Example 1, except that PVP in the cathode active material was prepared in an amount of 20 wt % using a PVP aqueous solution in which PVP was dissolved in an amount of 40 wt % in DI water.

Example 5

An experiment was performed in the same manner as in Example 1, except that carbon, sulfur and PVP dissolved in an amount of 10 wt % in DI water were simultaneously put and the resulting mixture was subjected to a ball-mill process when the composite is formed.

Comparative Example 1

A lithium-sulfur battery was prepared in the same manner as in Example 1, except that a cathode active material including a sulfur-carbon composite was used without adding PVP in Example 1.

Experimental Example 1

With respect to the lithium-sulfur batteries prepared in Examples 1 to 5 and Comparative Example 1, the change in charge and discharge characteristics was tested using a charge and discharge measuring device. For the battery obtained, the capacity maintenance ratio (%) was measured when 100 cycles were reached compared to the initial capacity by repeating 100 cycles of the charge and discharge each at a charge/discharge of 0.1 C/0.1 C and a charge/discharge of 0.5 C/0.5 C, and the results are shown in the following Table 1 and FIG. 2.

TABLE 1

| | 0.1 C | | 0.5 C | |
|---|---|---|---|---|
| | Initial capacity (mAh/g) | Capacity maintenance ratio after 100 cycles (%) | Initial capacity (mAh/g) | Capacity maintenance ratio after 100 cycles (%) |
| Example 1 | 1,100 | 91 | 1,050 | 90 |
| Example 2 | 990 | 90 | 945 | 90 |
| Example 3 | 890 | 90 | 850 | 89 |
| Example 4 | 800 | 89 | 760 | 89 |
| Example 5 | 450 | 85 | 400 | 80 |
| Comparative Example 1 | 1,100 | 64 | 1,050 | 34 |

As shown in Table 1, it can be seen that the battery of Example 1 according to an exemplary embodiment of the present application exhibited a capacity maintenance ratio of at least 90 even after 100 cycles compared to the initial capacity, whereas the battery of Comparative Example 1 had a considerably reduced capacity.

It is understood by those skilled in the art to which the present application belongs that various applications and modifications can be made within the scope of the present invention based on the contents.

The invention claimed is:
1. A cathode active material for a lithium-sulfur battery comprising:
   an amphiphilic polymer comprising hydrophilic parts and hydrophobic parts; and
   solid sulfur-carbon composite particles,
   wherein the amphiphilic polymer comprises one or more selected from the group consisting of polyvinyl pyrrolidone (PVP), polyvinyl alcohol (PVA) and a copolymer thereof, wherein the amphiphilic polymer is positioned on a surface of the solid sulfur-carbon composite particles to form a micelle structure, wherein the solid sulfur-carbon composite particles are particles which are sulfur particles applied on porous carbon, or particles which are sulfur particles mixed with carbon, and wherein the amphiphilic polymer is included in an amount of 5 to 20 wt % based on a total weight of the cathode active material.

2. The cathode active material for a lithium-sulfur battery of claim 1, wherein the hydrophobic parts of the amphiphilic polymer are oriented toward the solid sulfur-carbon composite particles.

3. A cathode comprising the cathode active material for a lithium-sulfur battery of claim 1.

4. A lithium-sulfur battery comprising:
an anode comprising lithium metal or a lithium alloy;
a cathode comprising the cathode active material of claim 1;
a separator positioned between the cathode and the anode; and
an electrolyte impregnated in the anode, cathode and the separator and comprising a lithium salt and an organic solvent.

5. The lithium-sulfur battery of claim 4, wherein the cathode further comprises one or more additives selected from transition metal elements, IIIA Group elements, IVA Group elements, sulfur compounds of these elements, and alloys of these elements and sulfur.

6. The lithium-sulfur battery of claim 4, wherein the lithium salt is one or more selected from the group consisting of LiSCN, LiBr, LiI, $LiPF_6$, $LiBF_4$, $LiSO_3CF_3$, $LiClO_4$, $LiSO_3CH_3$, $LiB(Ph)_4$, $LiC(SO_2CF_3)_3$ and $LiN(SO_2CF_3)_2$.

7. The lithium-sulfur battery of claim 4, wherein the lithium alloy as the anode active material is a lithium/aluminum alloy or a lithium/tin alloy.

8. The lithium-sulfur battery of claim 4, wherein the organic solvent is a single solvent or a mixed organic solvent of two or more solvents.

9. A battery module comprising the lithium-sulfur battery of claim 4 as a unit cell.

10. A method of preparing a cathode active material for a lithium-sulfur battery of claim 1, the method comprising:
mixing solid sulfur-carbon composite particles and a solution comprising the amphiphilic polymer comprising hydrophilic parts and hydrophobic parts.

* * * * *